United States Patent [19]
Molitorisz

[11] Patent Number: 4,880,503
[45] Date of Patent: Nov. 14, 1989

[54] HYDRAULIC RESERVOIR

[76] Inventor: Joseph Molitorisz, P.O. Box 748, Ames, Iowa 50010

[21] Appl. No.: 318,763

[22] Filed: Mar. 3, 1989

[51] Int. Cl.[4] .......................... F24H 3/00; F01P 11/08; F16N 39/02; F16N 7/08

[52] U.S. Cl. ....................................... 165/47; 165/128; 165/148; 165/916; 184/6.22; 184/104.1; 60/912

[58] Field of Search ................. 165/47, 128, 148, 916; 184/6.22, 104.1, 104.3; 60/912

[56] References Cited

U.S. PATENT DOCUMENTS

| | | | |
|---|---|---|---|
| 1,039,927 | 10/1912 | Gorrell | 165/128 |
| 1,717,716 | 6/1929 | MacKintosh | 165/148 |
| 1,910,697 | 5/1933 | Kiep | 60/912 |
| 2,051,026 | 8/1936 | Booth | 184/6.22 |
| 2,450,960 | 10/1948 | Heintz | 184/104.1 |
| 3,275,495 | 9/1966 | Lang | 165/47 |
| 3,996,999 | 12/1976 | Termont et al. | 165/148 |
| 4,256,031 | 3/1981 | Ryan | 60/912 |
| 4,813,477 | 3/1989 | Hansen et al. | 165/47 |

*Primary Examiner*—John Ford

[57] ABSTRACT

This invention pertains to improvements in the design of reservoirs for hydraulic systems, by providing self regulated temperature control for hydraulic fluids. The unique features of the reservoir of my invention include; an interconnected multi-chamber design with integrated vertical heat transfer tubes, for conductive and convective heat transfer from the hydraulic fluid to the surrounding atmosphere.

1 Claim, 1 Drawing Sheet

HYDRAULIC RESERVOIR

BACKGROUND OF THE INVENTION

The controlling of the temperature of the fluids in hydraulic systems is one of the critical requirements. The application of conventional radiator type coolers with small diameter tubes and thin walled fins, in mobile agricultural type apparatus which are operated under dusty conditions, is not practical, as the fins and small diameter tubes attract the fine dust particles, reducing the heat transfer capabilities of the radiator. It is, therefore, desirable to provide cooling means for the hydraulic systems of such machinery, that is not effected by dust deposition. My invention provides such cooling means with high efficiency even under adverse conditions.

The principles of convective heat transfer, specifically the "chimney effect" are well known, and have broad applications. This invention uses those principles in a unique way.

SUMMARY OF THE INVENTION

The hydraulic reservoir of my invention is designed to have a high percentage of its boundary surfaces in vertical planes, thereby reducing the deposition of dust or other particles which can reduce the heat transfer capability. It is partitioned into two chambers, an upper and a lower. The upper chamber receives the hydraulic fluid from the hydraulic system. After passing through the upper chamber the hydraulic fluid flows into the lower chamber, from where it is introduced again into the hydraulic system. To increase the heat dissipating capabilities of the reservoir a plurality of thin walled tubings, of about 4 inches inside diameter, are installed between the top and bottom boundary surfaces of the reservoir, passing through both chambers, and have both of their ends open for free vertical air movement. The design of the reservoir is such that the flow of the hydraulic fluid is restricted between the lateral boundaries of the reservoir and the thin walled tubes, thereby a large volume of fluid comes in direct contact with those surfaces.

The conductive heat transfer from the hydraulic fluid to the air column inside the thin walled tubes causes the rise of the temperature of the air column, and results in the upward flow of the warm air, drawing in air through the bottom opening of the tubes. The greater the temperature differential between the hydraulic fluid and the surrounding atmosphere, the more rapid the upward airflow becomes. This self-regulating airflow system functions like a slow moving fan, but without mechanical components. The relatively large surface area within the thin walled tubes, together with the induced upward flow of the warm air is capable of dissipating the heat from the hydraulic fluid at the rate, which is determined by the temperature differential. The vertical arrangement of the tubes prevents the deposition of dust and particles, thereby the heat transfer efficiency of the cooling system remains uneffected even under dusty operating conditions. The overall heat dissipating capability of the reservoir can be determined by the number of the chambers, and by the number of the vertical thin walled tubes.

DESCRIPTION OF THE PREFERRED EMBODIMENT

Figure 1:
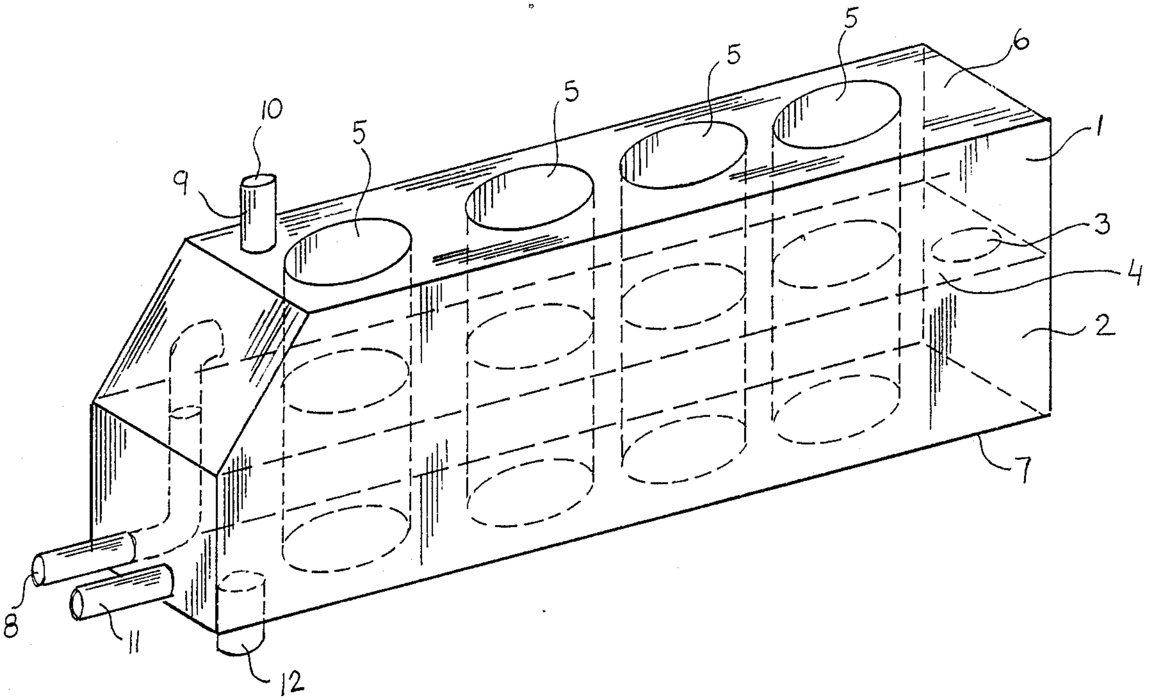
FIG. 1 is an isometric schematic diagram of the reservoir.

The reservoir of my invention consists of; two separate chambers 1 and 2, which are placed on top of each other, and which are interconnected by an opening 3 on the partition floor 4 between the two chambers, four thin walled tubings 5, which are inserted between the top and bottom boundary plates 6 and 7 of the reservoir, passing through both chambers, and having both the top and the bottom ends of the tubings 5 open for free vertical air flow within their confinements. The reservoir also has a return line 8, which delivers the hydraulic fluid to the upper chamber 1 from the hydraulic system. The upper chamber has a fill opening 9, which is closed with a breather cup 10. The lower chamber 2 has a discharge port 11 through which the hydraulic fluid enters the hydraulic system, and a drain opening 12, which is closed by a plug.

The warm hydraulic fluid returning from the hydraulic system enters the upper chamber 1 through the return line 8, flowing through the spaces between the side walls of the reservoir and the tubings 5, and flowing down into the lower chamber 2 through opening 3, where passing through the spaces between the side walls of the reservoir and the tubings 5 exits the lower chamber through the discharge port 11.

I claim:

1. A reservoir for hydraulic fluids in hydraulic systems, said reservoir having a plurality of separate chambers on top of each other, the said chambers being connected to each other by open ports through which the hydraulic fluid is allowed to flow between the said plurality of chambers, the said reservoir having a plurality of substantially vertical thin walled tubings installed between its upper and the lower boundary surfaces, the said thin walled tubings passing through the said plurality of chambers, the said thin walled tubings having both the upper and the lower ends open for free movement of the air through the confinements of the said thin walled tubings, the said thin walled tubings transferring the heat from the hydraulic fluid to the air column within the confinements of the said tubings causing the upward movement of the warm air through the confinements of each of the said plurality of thin walled tubings, the rate of transfer of the heat from the hydraulic fluid to the air column within the confinements of the said thin walled tubings being determined by the temperature differential between the hydraulic fluid and the surrounding atmosphere, thereby providing a self-regulated heat dissipation means from the said reservoir to the surrounding atmosphere, without power driven mechanical components.

* * * * *